(12) United States Patent
Ryu et al.

(10) Patent No.: US 12,404,395 B2
(45) Date of Patent: Sep. 2, 2025

(54) THERMOPLASTIC RESIN COMPOSITION AND MOLDED ARTICLE INCLUDING THE SAME

(71) Applicant: LG CHEM, LTD., Seoul (KR)

(72) Inventors: Hyun Jun Ryu, Daejeon (KR); Suk Jo Choi, Daejeon (KR); Tae Hoon Kim, Daejeon (KR); Hyunmin Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 859 days.

(21) Appl. No.: 17/639,079

(22) PCT Filed: Feb. 25, 2021

(86) PCT No.: PCT/KR2021/002344
§ 371 (c)(1),
(2) Date: Feb. 28, 2022

(87) PCT Pub. No.: WO2021/261703
PCT Pub. Date: Dec. 30, 2021

(65) Prior Publication Data
US 2022/0298347 A1 Sep. 22, 2022

(30) Foreign Application Priority Data

Jun. 26, 2020 (KR) .................. 10-2020-0078393
Feb. 25, 2021 (KR) .................. 10-2021-0025196

(51) Int. Cl.
| | | |
|---|---|---|
| C08L 25/14 | (2006.01) | |
| C08L 25/12 | (2006.01) | |
| C08L 33/06 | (2006.01) | |
| C08L 33/18 | (2006.01) | |
| C08L 51/00 | (2006.01) | |

(52) U.S. Cl.
CPC .............. *C08L 25/14* (2013.01); *C08L 25/12* (2013.01); *C08L 33/06* (2013.01); *C08L 33/18* (2013.01); *C08L 51/00* (2013.01)

(58) Field of Classification Search
CPC .......... C08L 25/14; C08L 25/12; C08L 33/06; C08L 33/18; C08L 51/00
See application file for complete search history.

(56) References Cited

U.S. PATENT DOCUMENTS

| | | | |
|---|---|---|---|
| 2006/0148992 A1 | 7/2006 | Kim et al. | |
| 2013/0345362 A1 | 12/2013 | Maeda et al. | |
| 2015/0005435 A1 | 1/2015 | Park et al. | |
| 2017/0247486 A1 | 8/2017 | Kang et al. | |
| 2018/0265690 A1 | 9/2018 | Kim et al. | |
| 2020/0040115 A1 | 2/2020 | Seo et al. | |
| 2021/0024735 A1 | 1/2021 | Park et al. | |
| 2021/0230333 A1 | 7/2021 | Jo et al. | |
| 2021/0246297 A1* | 8/2021 | Sung ................ | C08L 25/12 |
| 2021/0395510 A1 | 12/2021 | Shin et al. | |

FOREIGN PATENT DOCUMENTS

| | | |
|---|---|---|
| CN | 103958599 A | 7/2014 |
| EP | 2 865 714 A1 | 4/2015 |
| JP | 2000-302935 A | 10/2000 |
| JP | 2001-31830 A | 2/2001 |
| JP | 2012-214734 A | 11/2012 |
| KR | 10-0178457 A | 5/1999 |
| KR | 10-2013-0057795 A | 6/2013 |
| KR | 10-2013-0075793 A | 7/2013 |
| KR | 10-2015-0123709 A | 11/2015 |
| KR | 10-2017-0057205 A | 5/2017 |
| KR | 10-2017-0062984 A | 6/2017 |
| KR | 10-2019-0013569 A | 2/2019 |
| KR | 10-2019-0073323 A | 6/2019 |
| KR | 10-2019-0114898 A | 10/2019 |
| KR | 10-2020-0049623 A | 5/2020 |
| WO | 2019/243105 A1 | 12/2019 |
| WO | 2020/091336 A1 | 5/2020 |
| WO | 2020/091338 A1 | 5/2020 |
| WO | 2020/091370 A1 | 5/2020 |
| WO | 2020/091371 A1 | 5/2020 |

OTHER PUBLICATIONS

International Search Report and Written Opinion issued in corresponding International Patent Application No. PCT/KR2021/002344, dated Jun. 26, 2021.
Extended European Search Report issued in corresponding EP Patent Application No. 21 828 658.1, dated May 25, 2023. (WO 2020/091370, KR 2013-0057795, and KR 2020 0049623 cited therein were cited in earlier-filed SB08.).

(Continued)

*Primary Examiner* — Shane Fang
(74) *Attorney, Agent, or Firm* — Morgan, Lewis & Bockius LLP

(57) ABSTRACT

The present disclosure relates to a thermoplastic resin composition and a molded article including the same. The present disclosure relates to a thermoplastic resin composition including two or more types of acrylic graft resins (A) having different average particle diameters; a first copolymer (B) including an alkyl-substituted styrene, a (meth)acrylate, and a vinyl cyanide compound; a second copolymer (C) including an alkyl-unsubstituted styrene, a (meth)acrylate, and a vinyl cyanide compound; and a (meth)acrylate polymer (D), wherein the (meth)acrylate is included in an amount of 40 to 59% by weight based on a total weight of the thermoplastic resin composition, and a molded article including the thermoplastic resin composition. The thermoplastic resin composition having these compositional features may have excellent impact resistance, fluidity, and heat resistance, and may provide an economic advantage by suppressing increase in processing cost. In particular, the thermoplastic resin composition may implement a deep black color.

13 Claims, No Drawings

(56) References Cited

OTHER PUBLICATIONS

First Office Action issued in corresponding Japanese Patent Application No. 2022-519312, dated Mar. 20, 2023.
Office Action issued in corresponding Chinese Application No. 202180004988.7, dated Nov. 30, 2022.

* cited by examiner

THERMOPLASTIC RESIN COMPOSITION AND MOLDED ARTICLE INCLUDING THE SAME

TECHNICAL FIELD

Cross-Reference to Related Application

This application claims priority to Korean Patent Application No. 10-2020-0078393, filed on Jun. 26, 2020, and Korean Patent Application No. 10-2021-0025196, re-filed on Feb. 25, 2021, based on the priority of the above patent, in the Korean Intellectual Property Office, the disclosures of each of which are incorporated herein by reference.

The present invention relates to a thermoplastic resin composition and a molded article including the same. More particularly, the present invention relates to a thermoplastic resin composition having excellent impact resistance, fluidity, and heat resistance; and providing an economic advantage by not increasing processing cost; and implementing a deep black color, and a molded article including the thermoplastic resin composition.

BACKGROUND ART

To overcome the drawbacks of conventional acrylonitrile-butadiene-styrene (ABS) resins, such as poor weather resistance and chemical resistance, acrylonitrile-styrene-acrylate (ASA) resins having excellent weather resistance and chemical resistance have been used. In addition to weather resistance and chemical resistance, the ASA resins have excellent impact resistance, fluidity, heat resistance, and the like, and thus have been used in various fields such as automobiles, electric and electronic devices, office equipment, home appliances, toys, and stationery.

In recent years, in the automotive field, a painting process can be omitted by using ASA resins having excellent impact resistance, fluidity, heat resistance, weather resistance, and chemical resistance, thereby improving price competitiveness through cost reduction. In addition, to manufacture a molded article having a luxurious feeling, attempts to implement an ASA resin exhibiting a deep black color are being conducted.

However, conventional heat-resistant ASA resins used for automotive exterior materials have a limitation in realizing a deep black color due to poor compatibility with dyes.

Therefore, demand for an ASA resin exhibiting a deep black color and having excellent impact resistance, fluidity, and heat resistance is increasing in the automotive field.

RELATED ART DOCUMENTS

Patent Documents

KR 2015-0123709 A

DISCLOSURE

Technical Problem

Therefore, the present invention has been made in view of the above problems, and it is one object of the present invention to provide a thermoplastic resin composition having excellent impact resistance, fluidity, and heat resistance; providing an economic advantage by suppressing increase in processing cost; and implementing a deep black color and a molded article including the thermoplastic resin composition.

The above and other objects can be accomplished by the present invention described below.

Technical Solution

In accordance with one aspect of the present invention, provided is a thermoplastic resin composition including two or more types of acrylic graft resins (A) having different average particle diameters; a first copolymer (B) including an alkyl-substituted styrene, a (meth)acrylate, and a vinyl cyanide compound; a second copolymer (C) including an alkyl-unsubstituted styrene, a (meth)acrylate, and a vinyl cyanide compound; and a (meth)acrylate polymer (D), wherein the (meth)acrylate is included in an amount of 40 to 59% by weight based on a total weight of the thermoplastic resin composition.

In accordance with another aspect of the present invention, provided is a molded article including the thermoplastic resin composition.

Advantageous Effects

According to the present invention, a thermoplastic resin composition having excellent impact resistance, fluidity, and heat resistance; providing an economic advantage by not increasing the processing cost; and implementing a deep black color and a molded article including the thermoplastic resin composition can be provided.

BEST MODE

Hereinafter, a thermoplastic resin composition and a molded article including the same will be described in detail.

The present inventors made much effort to develop an ASA resin having a high degree of blackness. As a result, when an alkyl-substituted styrene-(meth)acrylate-vinyl cyanide compound copolymer and an alkyl-unsubstituted styrene-(meth)acrylate-vinyl cyanide compound copolymer were added to a composition including an ASA resin and a polymethyl methacrylate resin (hereinafter referred to as "PMMA resin"), heat resistance and fluidity were improved. In particular, when reducing the content of the PMMA resin and increasing the total weight of the (meth)acrylate in the composition, heat resistance, impact resistance, fluidity, and blackness were improved. Consequently, the present inventors confirmed that the resin composition of the present invention could provide a product having a luxurious feeling and high quality to industrial fields requiring high heat resistance and impact resistance, such as automotive exterior materials. Based on these results, the present inventors conducted further studies to complete the present invention.

The thermoplastic resin composition of the present invention includes two or more types of acrylic graft resins (A) having different average particle diameters; a first copolymer (B) including an alkyl-substituted styrene, a (meth)acrylate, and a vinyl cyanide compound; a second copolymer (C) including an alkyl-unsubstituted styrene, a (meth)acrylate, and a vinyl cyanide compound; and a (meth)acrylate polymer (D). In this case, based on a total weight of the thermoplastic resin composition, the (meth)acrylate is included in an amount of 40 to 59% by weight. In this case, impact resistance, fluidity, and heat resistance may be excellent, an economic advantage may be obtained by suppressing increase in processing cost, and a deep black color may be implemented.

Hereinafter, each component of the thermoplastic resin composition of the present invention will be described in detail.

(A) Acrylic Graft Resins

For example, the acrylic graft resins (A) of the present invention may include two or more types of acrylic graft resins having different average particle diameters. In this case, compared to a case of including one type of acrylic graft resin, impact resistance, colorability, elongation and heat resistance may be improved. In particular, blackness and impact resistance may be improved at the same time.

In this specification, unless defined otherwise, the acrylic graft resin may refer to a resin obtained by graft-polymerizing acrylate monomers.

Two or more types of acrylic graft resins described above mean two or more acrylic graft resins having different average particle diameters.

As a specific example, the acrylic graft resins (A) may include a first acrylic graft resin having an average particle diameter of 400 to 650 nm and a second acrylic graft resin having an average particle diameter of 50 to 160 nm. In this case, blackness may be improved while maintaining impact resistance, fluidity, and heat resistance at a high level.

For example, the first acrylic graft resin may have an average particle diameter of 300 to 650 nm, preferably 350 to 550 nm, more preferably 400 to 500 nm, still more preferably 450 to 500 nm. Within this range, in addition to excellent impact resistance, fluidity, and heat resistance, a high level of blackness may be implemented, enabling production of high-quality products that may be applied to automotive exterior materials.

For example, the second acrylic graft resin may have an average particle diameter of 30 to 250 nm, preferably 40 to 200 nm, more preferably 50 to 150 nm, still more preferably 80 to 130 nm. Within this range, in addition to excellent impact resistance, fluidity, and heat resistance, a high level of blackness may be implemented, enabling production of high-quality products that may be applied to automotive exterior materials.

In this specification, average particle diameter may be measured by dynamic light scattering, and specifically, may be measured as an intensity value using a Nicomp 380 HPL particle analyzer in a Gaussian mode.

In addition, in this specification, average particle diameter may mean an arithmetic average particle diameter, i.e., an average particle diameter of an intensity distribution, in a particle size distribution measured by dynamic light scattering. As a specific measurement example, a sample is prepared by diluting 0.1 g of latex (TSC: 35 to 50 wt %) 1,000 to 5,000 times with distilled water, and the average particle diameter of the sample is measured using a flow cell in auto-dilution in a measurement mode of dynamic light scattering/intensity 300 kHz/intensity-weight Gaussian analysis. At this time, setting values are as follows: temperature: 23° C.; measurement wavelength: 632.8 nm; and channel width: 10 μsec.

For example, the acrylic graft resins (A) may include the first acrylic graft resin and the second acrylic graft resin in a weight ratio of 1:1 to 1:30, preferably 1:1.5 to 1:20, more preferably 1:2 to 1:18. Within this range, blackness may be significantly improved while maintaining impact resistance, fluidity, and heat resistance at a high level.

In this specification, the weight ratio of the first acrylic graft resin to the second acrylic graft resin refers to the weight ratio of the first acrylic graft resin:the second acrylic graft resin.

For example, based on 100% by weight of the thermoplastic resin composition, the acrylic graft resins (A) may be included in an amount of 20 to 45% by weight, preferably 25 to 40% by weight, more preferably 31 to 38% by weight. Within this range, in addition to excellent impact resistance, colorability, elongation, fluidity, and heat resistance, a high level of blackness may be implemented.

For example, the acrylic graft resins (A) may be prepared by graft-copolymerizing an aromatic vinyl compound and a vinyl cyanide compound onto acrylate rubber.

For example, the acrylate rubber may have an average particle diameter of 400 to 600 nm, preferably 450 to 500 nm. Within this range, in addition to excellent impact resistance, fluidity, and heat resistance, a high level of blackness may be implemented.

As another example, the acrylate rubber may have an average particle diameter of 50 to 250 nm, preferably 70 to 150 nm. Within this range, in addition to excellent impact resistance, fluidity, and heat resistance, a high level of blackness may be implemented.

Here, the average particle diameter of the acrylate rubber is smaller than the average particle diameters of the acrylic graft resins.

For example, the acrylic graft resins (A) may include 40 to 60% by weight of acrylate rubber, 20 to 50% by weight of an aromatic vinyl compound, and 10 to 20% by weight of a vinyl cyanide compound. Within this range, impact resistance, fluidity, heat resistance, and blackness may be excellent.

As a preferred example, the acrylic graft resins (A) may include 45 to 55% by weight of acrylate rubber, 30 to 40% by weight of an aromatic vinyl compound, and 12 to 17% by weight of a vinyl cyanide compound. Within this range, blackness may be further improved while maintaining impact resistance, fluidity, and heat resistance at a high level.

In this specification, a resin comprising a certain compound refers to a polymer prepared by polymerizing the compound. In this case, a unit of the polymer is derived from the compounds.

For example, the acrylate rubber may be an alkyl acrylate rubber.

For example, the alkyl acrylate may be an acrylate having an alkyl group containing 1 to 10 carbon atoms, preferably alkyl acrylate having an alkyl group containing 4 to 10 carbon atoms, more preferably butyl acrylate. In this case, intrinsic physical properties such as weather resistance and chemical resistance may be excellent, and a high level of blackness may be implemented.

For example, the aromatic vinyl compound may include one or more selected from the group consisting of styrene, α-methylstyrene, 2,4-dimethylstyrene, vinyl toluene, t-butylstyrene, and chlorostyrene, preferably styrene. In this case, fluidity and mechanical properties may be excellent.

For example, the vinyl cyanide compound may include one or more selected from the group consisting of acrylonitrile, methacrylonitrile, and ethacrylonitrile, preferably acrylonitrile.

For example, the acrylic graft resins (A) may be acrylate-aromatic vinyl compound-vinyl cyanide compound graft copolymers, preferably butyl acrylate-styrene-acrylonitrile graft copolymers.

(B) First Copolymer

For example, the first copolymer (B) of the present invention may include an alkyl-substituted styrene, a (meth) acrylate, and a vinyl cyanide compound. In this case, blackness may be greatly improved.

As a specific example, the first copolymer (B) may be a copolymer of a monomer mixture including an alkyl-substituted styrene, a (meth)acrylate, and a vinyl cyanide compound.

The alkyl-substituted styrene is obtained by substituting at least one hydrogen of styrene with an alkyl group, and the alkyl group is preferably an alkyl group containing 1 to 20 carbon atoms.

For example, the alkyl-substituted styrene may include one or more selected from the group consisting of α-methylstyrene, p-methylstyrene, and 2,4-dimethylstyrene, preferably α-methylstyrene. In this case, the desired effects of the present invention may be effectively achieved.

For example, the (meth)acrylate may be an alkyl (meth) acrylate, preferably methyl methacrylate. In this case, the stability of the composition of the present invention may be improved, and as a result, impact resistance, fluidity, heat resistance, and blackness may be excellent.

For example, the vinyl cyanide compound may include one or more selected from the group consisting of acrylonitrile, methacrylonitrile, ethacrylonitrile, and 2-chloroacrylonitrile. In this case, the desired effects of the present invention may be effectively achieved.

For example, in the first copolymer (B), the alkyl-substituted styrene may be included in an amount of 25 to 50% by weight, preferably 30 to 45% by weight, more preferably 30 to 40% by weight, still more preferably 35 to 40% by weight based on 100% by weight of the first copolymer. Within this range, impact resistance, fluidity, heat resistance, and blackness may be excellent.

For example, in the first copolymer (B), the (meth) acrylate may be included in an amount of 40 to 60% by weight, preferably 40 to 55% by weight, more preferably 40 to 50% by weight based on 100% by weight of the first copolymer. Within this range, impact resistance, fluidity, and heat resistance may be excellent, an economic advantage may be obtained by suppressing increase in processing cost, and a deep black color may be implemented.

In this specification, unless defined otherwise, the processing cost may mean a cost used in a process for manufacturing a thermoplastic resin composition, such as a painting process.

For example, in the first copolymer (B), the vinyl cyanide compound may be included in an amount of 10 to 30% by weight, preferably 15 to 30% by weight, more preferably 17 to 22% by weight based on 100% by weight of the first copolymer. Within this range, impact resistance, fluidity, heat resistance, and blackness may be excellent.

For example, based on 100% by weight of the thermoplastic resin composition, the first copolymer (B) may be included in an amount of 10 to 30% by weight, preferably 15 to 22% by weight. Within this range, impact resistance, fluidity, heat resistance, and blackness may be excellent.

As the most preferred example, the first copolymer (B) may be an α-methylstyrene-methyl methacrylate-acrylonitrile copolymer. In this case, the desired effects of the present invention may be effectively achieved.

For example, the first copolymer (B) may have a glass transition temperature of 90 to 130° C., preferably 100 to 125° C., more preferably 110 to 122° C. Within this range, the resin composition of the present invention may have excellent heat resistance, and thus the resin composition may be applied to manufacture products requiring high heat resistance, such as automotive exterior materials.

In this specification, the glass transition temperature (Tg) may be measured using a differential scanning calorimeter (DSC), as a specific example, a differential scanning calorimeter manufactured by the TA Instrument company.

For example, the first copolymer (B) may have a weight average molecular weight of 70,000 to 150,000 g/mol, preferably 70,000 to 120,000 g/mol, more preferably 85,000 to 120,000 g/mol, still more preferably 90,000 to 110,000 g/mol. Within this range, impact resistance, fluidity, heat resistance, and blackness may be excellent.

In this specification, weight average molecular weight may be measured using tetrahydrofuran (THF) as an eluate through gel permeation chromatography. In this case, weight average molecular weight is obtained as a relative value to a polystyrene standard (PS) specimen. Specific measurement conditions are as follows: solvent: THF, column temperature: 40° C., flow rate: 0.3 ml/min, sample concentration: 20 mg/ml, injection amount: 5 µl, column model: 1×PLgel 10 µm MiniMix-B (250×4.6 mm)+1×PLgel 10 µm MiniMix-B (250×4.6 mm)+1×PLgel 10 µm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

For example, the first copolymer (B) may have a refractive index of 1.50 to 1.57, preferably 1.52 to 1.55. Within this range, heat resistance and blackness may be excellent.

In this specification, refractive index may be measured at 25° C. using an Abbe refractometer according to ASTM D542.

The first copolymer (B) of the present invention is a ternary copolymer including the alkyl-substituted styrene, the (meth)acrylate, and the vinyl cyanide compound, and is different from a binary copolymer including two components among the three components. Since the thermoplastic resin composition of the present invention includes the first copolymer, which is a ternary copolymer, blackness may be greatly improved while maintaining impact resistance, fluidity, and heat resistance at a high level.

In addition, the thermoplastic resin composition of the present invention does not include a binary copolymer, and the binary copolymer may be, for example, an alkyl-substituted styrene-acrylonitrile copolymer.

C) Second Copolymer

For example, the second copolymer (C) of the present invention may include an alkyl-unsubstituted styrene, a (meth)acrylate, and a vinyl cyanide compound. In this case, blackness may be greatly improved.

The alkyl-unsubstituted styrene means that no hydrogen of styrene is substituted with an alkyl group. In this case, substituents other than alkyl groups may be included.

For example, the alkyl-unsubstituted styrene may include one or more selected from the group consisting of styrene, p-bromostyrene, o-bromostyrene, and p-chlorostyrene, preferably styrene.

The (meth)acrylate and the vinyl cyanide compound included in the second copolymer (C) may be the same as the (meth)acrylate and the vinyl cyanide compound included in the first copolymer (B) of the present invention.

For example, the second copolymer (C) may include 15 to 30% by weight of the alkyl-unsubstituted styrene, 60 to 80% by weight of the (meth)acrylate, and 3 to 15% by weight of the vinyl cyanide compound. Within this range, impact resistance, fluidity, heat resistance, and blackness may be excellent.

For example, in the second copolymer (C), the alkyl-unsubstituted styrene may be included in an amount of 15 to 30% by weight, preferably 17 to 26% by weight, more preferably 20 to 25% by weight based on 100% by weight of the second copolymer. Within this range, fluidity and blackness may be excellent.

For example, in the second copolymer (C), the (meth)acrylate may be included in an amount of 60 to 80% by weight, preferably 63 to 78% by weight, more preferably 65 to 75% by weight based on 100% by weight of the second copolymer. Within this range, colorability may be improved without deterioration in impact resistance.

For example, in the second copolymer (C), the vinyl cyanide compound may be included in an amount of 3 to 15% by weight, preferably 5 to 15% by weight, more preferably 6 to 11% by weight based on 100% by weight of the second copolymer. Within this range, excellent chemical resistance and rigidity may be obtained.

For example, the second copolymer (C) may be included in an amount of 5 to 25% by weight, preferably 5 to 20% by weight based on 100% by weight of the thermoplastic resin composition. Within this range, fluidity may be excellent, and impact resistance, heat resistance, and blackness may be improved.

As the most preferred example, the second copolymer (C) may be a methyl methacrylate-styrene-acrylonitrile copolymer. In this case, the desired effects of the present invention may be effectively achieved.

For example, the second copolymer (C) may have a glass transition temperature of 80 to 120° C., preferably 90 to 110° C. Within this range, the resin composition of the present invention may have excellent heat resistance, and thus the resin composition may be applied to manufacture products requiring high heat resistance, such as automotive exterior materials.

For example, the second copolymer (C) may have a weight average molecular weight of 80,000 to 200,000 g/mol, preferably 100,000 to 170,000 g/mol, more preferably 120,000 to 155,000 g/mol. Within this range, impact resistance, fluidity, heat resistance, and blackness may be excellent.

For example, the second copolymer (C) may have a refractive index of 1.45 to 1.55, preferably 1.50 to 1.53. Within this range, blackness may be excellent.

(D) (Meth)acrylate Polymer

For example, the (meth)acrylate polymer (D) of the present invention may include 70% by weight or more of a methacrylate compound, preferably a polymethyl methacrylate resin including 100% by weight of a methacrylate compound. In this case, impact resistance, fluidity, heat resistance, and blackness may be excellent.

For example, based on 100% by weight of the thermoplastic resin composition, the (meth)acrylate polymer (D) may be included in an amount of 25 to 45% by weight, preferably 30 to 40% by weight. Within this range, colorability, scratch resistance, and weather resistance may be excellent, and blackness may be improved.

For example, the (meth)acrylate polymer (D) may have a glass transition temperature of 80 to 130° C., preferably 95 to 120° C. Within this range, heat resistance may be excellent.

For example, the (meth)acrylate polymer (D) may have a weight average molecular weight of 60,000 to 120,000 g/mol, preferably 85,000 to 120,000 g/mol, more preferably 80,000 to 100,000 g/mol. Within this range, blackness may be excellent.

For example, the (meth)acrylate polymer (D) may have a refractive index of 1.40 to 1.55, preferably 1.45 to 1.52. Within this range, blackness may be excellent.

Thermoplastic Resin Composition

For example, based on 100% by weight of the thermoplastic resin composition, the thermoplastic resin composition may include the (meth)acrylate in an amount of 40 to 59% by weight, preferably 45 to 59% by weight, more preferably 48 to 53% by weight. Within this range, impact resistance and blackness may be improved while maintaining heat resistance and fluidity at a high level.

In addition, when the (meth)acrylate is included in an amount less than the above range, a deep black color may be difficult to implement. When the (meth)acrylate is included in an amount exceeding the above range, impact resistance, fluidity, and heat resistance may be degraded. Thus, the content of the (meth)acrylate is preferably adjusted within the above range.

For example, the thermoplastic resin composition may further include a silicon compound. In this case, fluidity and impact resistance may be improved.

For example, the silicon compound may be a polyester-modified siloxane. In this case, fluidity and impact resistance may be improved, and a deep black color may be implemented.

The polyester-modified siloxane may mean a siloxane modified with a polyester.

For example, based on 100 parts by weight in total of the thermoplastic resin composition, the silicon compound may be included in an amount of 0.5 to 3 parts by weight, preferably 0.7 to 2 parts by weight, more preferably 0.8 to 1.2 parts by weight.

For example, the thermoplastic resin composition may further include one or more additives selected from the group consisting of a colorant, a lubricant, an antioxidant, a fluorescent brightening agent, a chain extender, a release agent, a pigment, a dye, an antibacterial agent, a processing aid, a metal deactivator, a smoke inhibitor, an inorganic filler, glass fiber, an anti-friction agent, an anti-wear agent, a heat stabilizer, and a UV stabilizer. In this case, compatibility may be excellent, and the desired effects of the present invention may be effectively achieved.

For example, based on 100 parts by weight in total of the thermoplastic resin composition, the additives may be included in an amount of 0.01 to 10 parts by weight, preferably 0.1 to 7 parts by weight, more preferably 1 to 5 parts by weight. Within this range, the desired effects of the present invention may be effectively achieved without deterioration in the intrinsic physical properties of the thermoplastic resin composition of the present invention.

For example, the colorant may be an anthraquinone-based dye, as a preferred example, a black organic dye containing 50% by weight or more of 1,4-bis(p-tolylamino)anthraquinone. The black organic dye is a green-tone black organic dye and has excellent compatibility with the composition of the present invention, thereby enabling easy expression of a deep black color.

For example, based on 100 parts by weight in total of the thermoplastic resin composition, the colorant may be included in an amount of 0.1 to 1.5 parts by weight, preferably 0.3 to 1.0 part by weight. Within this range, blackness may be excellent.

For example, the lubricant may include one or more selected from the group consisting of an ester-based lubricant, a metal salt-based lubricant, a carboxylic acid-based lubricant, a hydrocarbon-based lubricant, and an amide-based lubricant, preferably an amide-based lubricant, more preferably a stearamide-based lubricant, still more preferably alkylene bis(stearamide) containing alkylene having 1 to 10 carbon atoms. In this case, the intrinsic effects of a lubricant may be efficiently expressed without deterioration in the mechanical properties and thermal stability of a resin.

The stearamide-based lubricant may include stearamide and a stearamide substituent in which one or more hydrogens thereof are substituted with other substituents.

Ester-based lubricants, metal salt-based lubricants, carboxylic acid-based lubricants, hydrocarbon-based lubricants, and amide-based lubricants commonly used in the art may be used in the present invention without particular limit.

For example, based on 100 parts by weight in total of the thermoplastic resin composition, the lubricant may be included in an amount of 0.1 to 3 parts by weight, preferably 0.5 to 1.5 parts by weight. Within this range, the wettability of the composition of the present invention may be improved, and the composition of the present invention may have excellent impact resistance.

For example, the thermoplastic resin composition may have a Charpy impact strength (thickness: 4.0 mm, width after notched: 8 mm, 23° C.) of 5 kJ/m$^2$ or more, preferably 6 to 12 kJ/m$^2$ as measured according to ISO 179-1. Within this range, the thermoplastic resin composition of the present invention may have excellent impact resistance.

For example, the thermoplastic resin composition may have a flow index of 4 to 20 g/10 min, preferably 5 to 15 g/10 min, more preferably 5 to 10 g/10 min as measured under conditions of 220° C. and 10 kgf according to ISO 1133-1. Within this range, due to excellent fluidity thereof, the thermoplastic resin composition may be easily injection-molded into products of various shapes.

For example, the thermoplastic resin composition may have a heat deflection temperature of 70 to 100° C., preferably 75 to 85° C. as measured according to ISO 75. Within this range, physical property balance may be excellent, and heat resistance may be improved.

For example, the thermoplastic resin composition may have a Vicat softening temperature (VST) of 90 to 120° C., preferably 94 to 110° C. as measured according to ISO 306. Within this range, physical property balance may be excellent, and heat resistance may be improved.

For example, the thermoplastic resin composition may have a blackness (L) of 4 or less, preferably 1 to 3.5, more preferably 1 to 2.5 as measured in an SCE mode. Within this range, a deep black color may be implemented, thereby providing a product having a luxurious feeling.

Hereinafter, a method of preparing the thermoplastic resin composition of the present invention and a molded article including the thermoplastic resin composition will be described. In description of the method of preparing the thermoplastic resin composition and the molded article including the thermoplastic resin composition, all the contents of the thermoplastic resin composition of the present invention are included.

Method of Preparing Thermoplastic Resin Composition

For example, the method of preparing the thermoplastic resin composition of the present invention includes a step of kneading and extruding two or more types of acrylic graft resins (A) having different average particle diameters; a first copolymer (B) including an alkyl-substituted styrene, a (meth)acrylate, and a vinyl cyanide compound; a second copolymer (C) including an alkyl-unsubstituted styrene, a (meth)acrylate, and a vinyl cyanide compound; and a (meth)acrylate polymer (D). In this case, based on a total weight of the thermoplastic resin composition, the (meth)acrylate is included in an amount of 40 to 59% by weight. In this case, impact resistance, fluidity, and heat resistance may be excellent, an economic advantage may be obtained by suppressing increase in processing cost, and a deep black color may be implemented.

In this specification, unless defined otherwise, "comprising ~" includes the meaning of "prepared by polymerizing ~".

For example, the step of kneading and extruding may be performed using a single-screw extruder, a twin-screw extruder, or a Banbury mixer. In this case, since the composition is uniformly dispersed, compatibility may be excellent.

For example, the step of kneading and extruding may be performed at a processing temperature of 200 to 300° C., preferably 220 to 270° C. In this case, throughput per unit time may be appropriate, and melting and kneading may be sufficiently performed. In addition, occurrence of problems such as thermal decomposition of a resin component may be prevented.

For example, the kneading and extruding may be performed at a screw rotation rate of 100 to 500 rpm, 150 to 400 rpm, 100 to 350 rpm, 200 to 310 rpm, preferably 250 to 350 rpm. In this case, throughput per unit time may be appropriate, and thus process efficiency may be excellent. In addition, excessive cutting may be prevented.

Molded Article

For example, the molded article of the present invention may include the thermoplastic resin composition of the present invention. Since the molded article has excellent heat resistance and impact resistance, deformation due to external environments may be very small, and a high level of blackness may be implemented, thereby providing a luxurious feeling.

For example, the molded article may be an automotive exterior material. In this case, since the molded article includes the thermoplastic resin composition of the present invention, the molded article may satisfy all of heat resistance, impact resistance, fluidity, a deep black color, and economics required by the market, thereby providing a high-quality automotive exterior material.

For example, the automotive exterior material may be a side mirror housing, a radiator grill, a filler, or a garnish. Compared to conventional cases, cost may be reduced, thereby providing an economic advantage. In addition, the automotive exterior material may satisfy consumer needs such as heat resistance, impact resistance, and a deep black color.

In description of the thermoplastic resin composition of the present invention and the molded article including the same, other conditions or equipment not explicitly described herein may be appropriately selected within the range commonly practiced in the art, without particular limit.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples and Comparative Examples below are as follows.

(A1) First acrylic graft resin: an ASA resin having an average particle diameter of 450 to 500 nm prepared by graft-polymerizing styrene and acrylonitrile onto a butyl acrylate rubber (A2) Second acrylic graft resin: an ASA resin having an average particle diameter of 300 to 350 nm prepared by graft-polymerizing styrene and acrylonitrile onto a butyl acrylate rubber (E1) Polyester-modified silicon compound (TEGOMER 6441P, EVONIK Co.) (melting point (Tm): about 54° C.)

(F1) Colorant containing 1,4-bis(p-tolylamino)anthraquinone as a main component

Examples 1 to 6, Comparative Examples 1 to 9, and Reference Examples 1 and 2

The above-described components were mixed and stirred according to the contents shown in Table 1 below to prepare thermoplastic resin compositions.

TABLE 1

| Classification | Examples | | | | | | Comparative Examples | | | | | | | | | Reference Examples | |
|---|---|---|---|---|---|---|---|---|---|---|---|---|---|---|---|---|---|
| | 1 | 2 | 3 | 4 | 5 | 6 | 1 | 2 | 3 | 4 | 5 | 6 | 7 | 8 | 9 | 1 | 2 |
| (A1) ASA resin | 3 | — | — | 2 | 4 | — | — | — | 10 | 10 | 2 | — | 2 | 3 | 2 | 20 | 30 |
| (A2) ASA resin | — | 10 | 7 | — | — | 4 | 10 | — | — | — | — | 10 | — | — | — | — | — |
| (A3) ASA resin | 30 | 23 | 26 | 35 | 29 | 32 | 23 | 33 | 23 | 23 | 35 | 23 | 35 | 30 | 35 | 13 | 3 |
| (B1) AMS-MMA-AN copolymer | 18 | 20 | 18 | 21 | 18 | 21 | — | 18 | — | — | — | 7 | 30 | — | 28 | 18 | 18 |
| (B2) AMS-AN copolymer | — | — | — | — | — | — | — | — | — | — | — | — | — | 18 | — | — | — |
| (C1) MMA-SM-AN copolymer | 15 | 15 | 15 | 7 | 15 | 7 | — | 15 | — | 30 | 28 | 10 | 23 | 15 | — | 15 | 15 |
| (D1) PMMA | 34 | 32 | 34 | 35 | 34 | 36 | 67 | 34 | 67 | 33 | 35 | 55 | 5 | 34 | 35 | 34 | 34 |
| (E1) Silicon compound | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| (F1) Colorant | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| Total weight of MMA[wt %] | 51~54 | 50~53 | 51~54 | 48~51 | 51~54 | 49~52 | 67 | 51~54 | 67 | 53~56 | 53~56 | 64~66 | 32~37 | 44~45 | 46~49 | 51~54 | 51~54 |

(A3) Third acrylic graft resin: an ASA resin having an average particle diameter of 80 to 130 nm prepared by graft-polymerizing styrene and acrylonitrile onto a butyl acrylate rubber (B1) AMS-MMA-AN ternary copolymer including 30 to 40% by weight of α-methylstyrene (AMS), 40 to 50% by weight of methyl methacrylate (MMA), and 15 to 30% by weight of acrylonitrile (AN) and having a glass transition temperature of about 120° C., a weight average molecular weight of 85,000 to 120,000 g/mol, and a refractive index of 1.5336

(B2) AMS-AN copolymer including 65 to 75% by weight of α-methylstyrene and 25 to 35% by weight of acrylonitrile and having a glass transition temperature of about 123° C., a weight average molecular weight of 85,000 to 120,000 g/mol, and a refractive index of 1.5695

(C1) MMA-SM-AN copolymer including 65 to 75% by weight of methyl methacrylate, 20 to 25% by weight of styrene (SM), and 5 to 15% by weight of acrylonitrile and having a glass transition temperature of about 102° C., a weight average molecular weight of 100,000 to 170,000 g/mol, and a refractive index of 1.515

(D1) Polymethyl methacrylate having a glass transition temperature of about 113° C., a weight average molecular weight of 85,000 to 120,000 g/mol, and a refractive index of 1.49

In Table 1, the content of each of (A1), (A2), (A3), (B1), (B2), (C1), and (D1) is given in % by weight based on the total weight thereof, and the content of each of (E1) and (F1) is given in parts by weight based on 100 parts by weight in total of (A1), (A2), (A3), (B1), (B2), (C1), and (D1). In addition, in Table 1, the total weight of MMA is the total weight of MMA included in components (B1), (B2), (C1), and (D1), and is calculated based on 100% by weight in total of (A1), (A2), (A3), (B1), (B2), (C1), and (D1).

Test Examples

The thermoplastic resin compositions prepared in Examples 1 to 6, Comparative Examples 1 to 9, and Reference Examples 1 and 2 were fed into an extrusion kneader (processing temperature: 240° C.) and extruded to prepare pellets. The prepared pellets were injected using a 120 MT injection machine (processing temperature: 240° C.) according to ISO standard to obtain specimens. The properties of the specimens were measured using the following methods, and the results are shown in Table 2 below. For reference, specimens for measuring blackness were prepared as square high-gloss specimens having a size of 3 mm (thickness)×10 cm (width)×10 cm (length). The high-gloss specimens had a gloss of 85 to 95 as measured at 60° using a GLOSS meter.

(1) Charpy impact strength (kJ/m², notched, thickness: 4.0 mm, width after notched: 8 mm): Charpy impact strength was measured at 23° C. using an IMPACT TESTER (Tinius Olsen Co.) according to ISO 179-1. Here, as the measurement value increases, impact resistance increases.

(2) Flow index (g/10 min): Weight was measured at a temperature of 220° C. under a load of 10 kg for 10 minutes using an MI-4 (GOTTFERT Co.) according to ISO 1133-1. Here, as the measurement value increases, fluidity becomes better.

(3) Heat deflection temperature (° C.): Heat deflection temperature was measured using an auto HDT Tester 6A-2 (TOYOSEIKI Co.) according to ISO 75. Here, as the measurement value increases, heat resistance increases.

(4) Vicat softening temperature (° C.): Vicat softening temperature was measured using a device manufactured by the TOYOSEIKI corporation according to ISO 306. Here, as the measurement value increases, heat resistance increases.

(5) Blackness (L): An L value was measured in an SCE mode using a Ci7800 (X-rite Co.). Here, the L value is a value for determining white to black values in the L*a*b* color system. As the L value decreases, blackness becomes better.

of the present invention are significantly improved. In addition, it can be confirmed that, compared to Comparative Examples 4 and 5 not including (B1), the blackness of the thermoplastic resin composition of the present invention is significantly improved.

In addition, it can be confirmed that, compared to Comparative Example 2 in which one type of ASA resin is used, the thermoplastic resin composition of the present invention has excellent impact resistance while maintaining fluidity, heat resistance, and blackness equal or superior to those of the thermoplastic resin composition of Comparative Example 2. The composition having reduced impact resistance according to Comparative Example 2 is difficult to apply to products requiring high impact resistance, such as automotive exterior materials.

In addition, it can be confirmed that, compared to Comparative Example 6 in which (A), (B), (C), and (D) are included but the (meth)acrylate is included in an amount exceeding the weight range of the present invention, Examples 1 to 6, in which (A), (B), (C), and (D) are included and the (meth)acrylate is included within the weight range of the present invention, have excellent impact resistance, fluidity, and heat resistance.

TABLE 2

| Classification | Examples | | | | | | Comparative Examples | | | | | | | | | Reference Examples | |
|---|---|---|---|---|---|---|---|---|---|---|---|---|---|---|---|---|---|
| | 1 | 2 | 3 | 4 | 5 | 6 | 1 | 2 | 3 | 4 | 5 | 6 | 7 | 8 | 9 | 1 | 2 |
| Charpy impact strength [kJ/m$^2$] | 8 | 9 | 8 | 9.1 | 8.3 | 8.4 | 8 | 5.9 | 8.6 | 8 | 8.2 | 6 | 8.6 | 8 | 9.2 | 9.8 | 11.8 |
| Flow index (MI) [g/10 min] | 6.7 | 6 | 6.5 | 5.2 | 6.3 | 5.7 | 4.4 | 6.8 | 3.8 | 5.5 | 4.8 | 4.5 | 5.8 | 5.8 | 5.8 | 5.8 | 5.3 |
| Heat deflection temperature (HDT) [° C.] | 78 | 80 | 78 | 80 | 80 | 80 | 78 | 77 | 78 | 76 | 77 | 78 | 79 | 79 | 81 | 78 | 78 |
| Vicat softening temperature (VST) [° C.] | 96 | 97 | 96 | 97 | 97 | 97 | 96 | 95 | 96 | 94 | 94 | 95 | 97 | 96 | 98 | 96 | 96 |
| Blackness (L) | 2.1 | 3.2 | 3.0 | 2.0 | 2.0 | 2.4 | 4.7 | 2.2 | 5.7 | 4.8 | 4.9 | 3.1 | 4.2 | 6 | 5.3 | 4.4 | 4.7 |

As shown in Table 2, it can be confirmed that the thermoplastic resin compositions of Examples 1 to 6 according to the present invention have heat resistance and fluidity equal or superior to those of the thermoplastic resin compositions of Comparative Examples 1 to 9, whereas the impact resistance and blackness of the thermoplastic resin compositions of Examples 1 to 6 are very much improved compared to Comparative Examples 1 to 9. In particular, since the thermoplastic resin composition of the present invention includes two types of acrylic graft resins having different average particle diameters in a specific weight ratio, the thermoplastic resin composition of the present invention has excellent impact resistance, fluidity, and heat resistance and implements a high level of blackness, thereby providing a luxurious feeling.

In addition, it can be confirmed that, compared to Comparative Examples 1 and 3 not including (B1) and (C1), the fluidity and blackness of the thermoplastic resin composition In addition, it can be confirmed that, compared to Comparative Example 7 in which the (meth)acrylate is included in an amount less than the weight range of the present invention, Examples 1 to 6 in which the (meth)acrylate is included within the weight range of the present invention have excellent blackness.

In addition, it can be confirmed that, compared to Examples 1 to 6, in the case of Comparative Example 8 including the binary copolymer (B2) consisting of the alkyl-substituted styrene and the vinyl cyanide compound instead of the ternary copolymer (B1) consisting of the alkyl-substituted styrene, the (meth)acrylate, and the vinyl cyanide compound, blackness is significantly deteriorated, and thus the desired effect of the present invention, i.e., a deep black color, is not implemented.

In addition, it can be confirmed that, compared to Examples 1 to 6, in the case of Comparative Example 9 that does not just include (C1), blackness is significantly deteriorated.

The invention claimed is:

1. A thermoplastic resin composition, comprising:
two or more acrylic graft resins (A) having different average particle diameters;
a first copolymer (B) comprising a first alkyl-substituted styrene, a first (meth)acrylate, and a first vinyl cyanide compound;
a second copolymer (C) comprising a second alkyl-unsubstituted styrene, a second (meth)acrylate, and a second vinyl cyanide compound; and
a (meth)acrylate polymer (D),
wherein the first (meth)acrylate and the second (meth)acrylate are comprised in a total amount of from 40 to 59% by weight based on a total weight of the thermoplastic resin composition.

2. The thermoplastic resin composition according to claim 1, wherein the thermoplastic resin composition comprises from 20 to 45% by weight of the two or more acrylic graft resins (A); from 10 to 30% by weight of the first copolymer (B); from 5 to 25% by weight of the second copolymer (C); and from 25 to 45% by weight of the (meth)acrylate polymer (D).

3. The thermoplastic resin composition according to claim 1, wherein the two or more acrylic graft resins (A) comprise a first acrylic graft resin having an average particle diameter of from 400 to 650 nm and a second acrylic graft resin having an average particle diameter of from 50 to 160 nm.

4. The thermoplastic resin composition according to claim 3, wherein the two or more acrylic graft resins (A) comprise the first acrylic graft resin and the second acrylic graft resin in a weight ratio of from 1:1 to 1:30.

5. The thermoplastic resin composition according to claim 1, wherein the first copolymer (B) comprises from 25 to 50% by weight of the first alkyl-substituted styrene, from 40 to 60% by weight of the first (meth)acrylate, and from 10 to 30% by weight of the first vinyl cyanide compound.

6. The thermoplastic resin composition according to claim 1, wherein the second copolymer (C) comprises from 15 to 30% by weight of the second alkyl-unsubstituted styrene, from 60 to 80% by weight of the second (meth)acrylate, and from 3 to 15% by weight of the second vinyl cyanide compound.

7. The thermoplastic resin composition according to claim 1, wherein the thermoplastic resin composition has a blackness (L) of 4 or less as measured in an SCE mode.

8. The thermoplastic resin composition according to claim 1, wherein the thermoplastic resin composition has a flow index of from 4 to 20 g/10 min as measured under conditions of 220° C. and 10 kgf according to ISO 1133-1.

9. The thermoplastic resin composition according to claim 1, wherein the thermoplastic resin composition has a Charpy impact strength of 5 KJ/m$^2$ or more as measured under conditions of 4.0 mm thickness, 8 mm width after notched and 23° C. according to ISO 179-1.

10. The thermoplastic resin composition according to claim 1, wherein the thermoplastic resin composition further comprises a silicon compound.

11. The thermoplastic resin composition according to claim 1, wherein the thermoplastic resin composition further comprises one or more additives selected from the group consisting of a colorant, a lubricant, an antioxidant, a fluorescent brightening agent, a chain extender, a release agent, a pigment, a dye, an antibacterial agent, a processing aid, a metal deactivator, a smoke inhibitor, an inorganic filler, glass fiber, an anti-friction agent, an anti-wear agent, a heat stabilizer, and a UV stabilizer.

12. A molded article, comprising the thermoplastic resin composition of claim 1.

13. The molded article according to claim 12, wherein the molded article is an automotive exterior material.

* * * * *